(12) United States Patent
Wayte

(10) Patent No.: US 12,221,401 B2
(45) Date of Patent: Feb. 11, 2025

(54) SECONDARY EXPLOSIVE

(71) Applicant: Richard Charles Wayte, Berkshire (GB)

(72) Inventor: Richard Charles Wayte, Berkshire (GB)

(*) Notice: Subject to any disclaimer, the term of this patent is extended or adjusted under 35 U.S.C. 154(b) by 841 days.

(21) Appl. No.: 17/375,484

(22) Filed: Jul. 14, 2021

(65) Prior Publication Data
US 2021/0343430 A1 Nov. 4, 2021

Related U.S. Application Data

(63) Continuation-in-part of application No. 16/262,278, filed on Jan. 30, 2019, now abandoned, which is a continuation of application No. 14/778,569, filed as application No. PCT/GB2014/051386 on May 6, 2014, now abandoned.

(30) Foreign Application Priority Data

May 6, 2013 (GB) .................................. 1308127

(51) Int. Cl.
C06B 39/00 (2006.01)
C06B 39/06 (2006.01)

(52) U.S. Cl.
CPC .................... *C06B 39/06* (2013.01)

(58) Field of Classification Search
CPC .................................................... C06B 39/06
USPC .......................................................... 149/30
See application file for complete search history.

(56) References Cited

U.S. PATENT DOCUMENTS

| 3,987,590 | A | * | 10/1976 | Chianelli | .................. | B24B 1/00 |
| | | | | | | 376/916 |
| 4,058,486 | A | | 11/1977 | Mallozzi et al. | | |
| 4,290,847 | A | | 9/1981 | Johnson et al. | | |
| 4,328,070 | A | | 5/1982 | Winterberg | | |
| 5,043,131 | A | | 8/1991 | Musinski et al. | | |
| 5,430,776 | A | | 7/1995 | Stauffer et al. | | |
| 5,992,354 | A | | 11/1999 | Ahern et al. | | |
| 2001/0040935 | A1 | | 11/2001 | Case | | |
| 2003/0031285 | A1 | | 2/2003 | Osipov et al. | | |
| 2003/0112916 | A1 | | 6/2003 | Keeney et al. | | |
| 2006/0088138 | A1 | * | 4/2006 | Jouanneau | ................ | G21B 3/00 |
| | | | | | | 376/131 |
| 2007/0263758 | A1 | * | 11/2007 | Day | ......................... | G21B 3/00 |
| | | | | | | 376/100 |
| 2009/0000268 | A1 | | 1/2009 | Yurash | | |
| 2010/0219385 | A1 | | 9/2010 | Miller | | |

(Continued)

FOREIGN PATENT DOCUMENTS

DE 102007022302 A1 11/2008

OTHER PUBLICATIONS

Lawson, J.D. "Some Criteria for a Power Producing Thermonuclear Reactor" Proc. Phys. Soc. 870, 1957, pp. 6-10. (Year: 1957).

(Continued)

*Primary Examiner* — James E McDonough
(74) *Attorney, Agent, or Firm* — Westman, Champlin & Koehler, P.A.; Z. Peter Sawicki

(57) ABSTRACT

An explosive mixture compositionally comprises a powdered deuteride of an alkaline earth metal or alkali metal mixed with a catalytic mixture, wherein said catalytic mixture comprises red phosphorous powder and a transition metal powder from Period 4 or Period 5 of the Periodic table.

6 Claims, 5 Drawing Sheets

(56) References Cited

U.S. PATENT DOCUMENTS

| 2011/0044416 | A1 | 2/2011 | Galindo Cabello et al. |
|---|---|---|---|
| 2011/0182392 | A1 | 7/2011 | Wessel et al. |
| 2013/0058446 | A1 | 3/2013 | Zheng |
| 2014/0153683 | A1 | 6/2014 | Peery et al. |

OTHER PUBLICATIONS

Edwards, M.J., et al. "Progress towards ignition on the National Ignition Facility" Physics of Plasmas 20, 2013, 070501. (Year: 2013).

Park, H-S. et al. "High-Adiabat High-Foot Inertial Confinement Fusion Implosion Experiments on the National Ignition Facility" Phys. Rev. Lett. 112, 2014, 055001. (Year: 2014).

Nuttall, W.J. "Fusion as an Energy Source: Challenges and Opportunities" Institute of Physics Report, 2008. (Year: 2008).

Scharping, N. "Why Nuclear Fusion is Always 30 Years Away" The Crux, 2016, available at http://blogs.discovermagazine.com/crux/2016/03/23/nuclear-fusion-reactor-research/#.WITDb_I95aQ. (Year: 2016).

Seife, C. Sun in a Bottle, Penguin Group 2008, Ch 10, pp. 220-227. (Year: 2008).

Seife, C. Sun in a Bottle, Penguin Group 2008, Ch 6, pp. 127-157. (Year: 2008).

Close, F. Too Hot to Handle The Race for Cold Fusion, Princeton University Press 1991. (Year: 1991).

Report of the Review of Low Energy Nuclear Reactions, DOE, 2004. (Year: 2004).

Merkuliev, Yu A., et al., "Novel Technologies in Microfusion," AIP Conference Proceedings, vol. 849, 2006, pp. 363-367.

Borisenko, N. G. et al., "Laser Targets and Experiments for the Sake of Science and Energy in the 22nd Century," Journal of Physics, vol. 75, No. 6, Dec. 2010, pp. 1115-1127.

Examination Report received in European Patent Office, Application No. 14723852.1, dated May 2, 2017, 6 pages.

Nora et al., "Gigabar Sperical Shock Generation on the OMEGA Laser," PRL 114 045001 (2015).

International Search Report and Written Opinion received in Patent Cooperation Treaty Application No. PCT/GB2014/051386, mailed Aug. 1, 2014, 8 pages.

Search Report received in Great Britain Patent Application No. GB1308127.8, dated Feb. 11, 2014, 2 pages.

Bel'kov, S.A., et al., "Application of Beryllium Deuteride as a Material for Laser X-Ray Target Shells," Quantum Electronics, vol. 32, No. 1, 2002, pp. 27-30.

Haiping, Wang, et al., "The Synthesis of LiBH4 Films Under Low Hydrogen Pressure at Ambient Temperature," Materials Letters, vol. 64, No. 3, Feb. 15, 2010, pp. 320-322.

Newton, T.D., et al., "A Moderate Target Sub-Assembly Design for Minor Actinide Transmutation," http://www.answersoftwareservice.com/resource/pdfs/global_paper_2003.pdf, retrieved on Jul. 15, 2014, 10 pages.

Wu, H., et al., "Structure and Vibrational Spectra of Calcium Hydride and Deuteride," Journals of Alloys and Compounds, vol. 436, No. 1-2, Apr. 10, 2007, pp. 51-55.

Yvon, Klaus, "Magnesium Based Ternary Metal Hydrides Containing Alkali and Alkaline-Earth Elements," Journals of Alloys and Compounds, vol. 425, No. 1-2, Nov. 30, 2006, pp. 101-108.

Berlinguette, C., et al. "Revisiting the cold case of cold fusion." Nature. vol. 570 (2019), pp. 45-51.

\* cited by examiner

SECONDARY EXPLOSIVE

CROSS REFERENCE TO RELATED APPLICATIONS

This Application is a Continuation in Part of application Ser. No. 16/262,278, filed on Jan. 30, 2019, which is a Continuation of application Ser. No. 14/778,569, filed Sep. 18, 2015 as a Section 371 National Stage Application of International Application No. PCT/GB2014/051386, filed on May 6, 2014, and published as WO 2014181097A1 on Nov. 13, 2014, in English, which claims priority to and benefit of Great Britain Application No. GB1308127.8, filed on May 6, 2013, the contents of which are hereby incorporated by reference in their entirety.

BACKGROUND

In this patent application, the invention is a new explosive mixture. The measured explosive strength of this mixture is great enough for its proposed use as a secondary explosive.

Secondary explosives are insensitive to shock so they require an explosive booster.

Secondary explosives are used for mining and quarrying operations because they are inherently safe.

SUMMARY

An aspect of the present disclosure relates to an explosive mixture and to making a prescribed solid-state explosive mixture.

The explosive mixture compositionally comprises a powdered deuteride of an alkaline earth metal or alkali metal mixed with a catalytic mixture, wherein said catalytic mixture comprises red phosphorous powder and a powdered transition metal from Period 4 or Period 5 of the Periodic table.

The invention provides a process for making a powerful explosion by compressing the mixture comprising the deuteride mixed with the catalytic mixture.

In particular embodiments of the invention, the deuteride may be of an alkaline earth metal, for example calcium.

The catalytic mixture may comprise a mixture containing red phosphorus and a transition metal from Period 4 or Period 5 of the Periodic table.

In particular embodiments, the transition metal is from Period 4 of the Periodic table, for example, manganese.

The explosive may be formed from a mixture of powders of red phosphorus, the chosen transition metal(s), and the chosen deuteride(s).

The particle sizes of the respective powders may be distributed in the range up to 75 microns, for example (20-75) microns.

The weight proportions of the three ingredients of the explosive, (deuteride, phosphorus and transition metal), may be made equal to each other in a 1:1:1 ratio, or approximately within 10% of equal to each other, for example in a ratio 1.0:0.9:1.1.

If desired, the explosive may comprise a mixture of deuteride(s) and hydride(s), where the deuteride(s) provide(s) the main source and the hydride(s) the lesser source of explosive energy. This may be of benefit in moderating the explosive reaction An advantage of this invention is that the explosive is immediately available and inexpensive to produce. The person skilled in the art will choose which method is appropriate for applying the compressive force necessary to ignite the explosive, for example which primary explosive design to use for mining or quarrying.

In some embodiments of process according to the invention, it may be advantageous to heat the explosive mixture with a very hot wire in addition to applying a compressive force.

Development of the invention thus far will now be described in further detail by way of example only, taken from many experiments with reference to the accompanying drawings.

BRIEF DESCRIPTION OF THE DRAWINGS

The drawings illustrate embodiments of apparatus employed repetitively for demonstrating the efficacy of the invention, all of which have been tested successfully by the Applicant. These are shown in FIGS. 1 to 5, which will be described in more detail below.

DETAILED DESCRIPTION

For optimizing the explosive properties, the following procedures were performed in more than a hundred varied experiments, resulting in powerful explosive reports shattering the compression cells.

In all embodiments, the explosive mixture compositionally comprises a powdered deuteride of an alkaline earth metal mixed with a catalytic mixture, wherein said catalytic mixture comprises red phosphorous powder and a powdered transition metal. This mixture is compressible for producing a strong explosion.

Best mode experiments employed calcium deuteride, which was produced by heating turnings of calcium metal in an atmosphere of deuterium within a silica tube. The deuteride lumps were then ground to a powder with mortar and pestle, and mixed with similar weights of red phosphorus powder and manganese powder, to yield the best prescribed explosive mixture for the following experiments. Care was taken to manufacture and store this explosive mixture with minimum exposure to air and moisture, which would ruin its efficacy The particle sizes of the respective powders were distributed in the range up to 75 microns, for example (20-75) microns. No chemical analysis of this explosive mixture was necessary prior to using it.

It is anticipated that other alkaline earth or alkali deuterides would work in place of calcium deuteride because their primary function is to fix the deuterium in the mixture. Similarly, some other transition metals have catalytic properties and would work in place of manganese.

Figure 1:
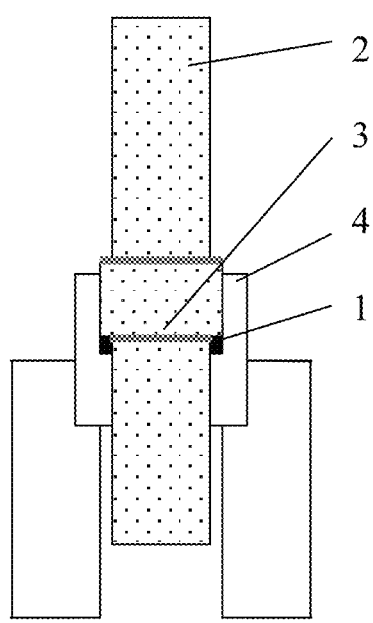
Figure 2:
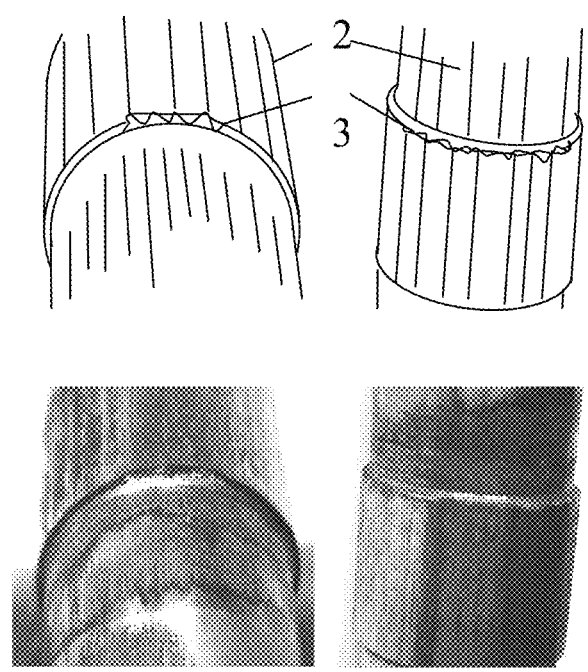

FIG. 1 shows a successful embodiment of the explosive which was compressed and demonstrated a powerful explosion. The compression was carried out by a process consisting of a case-hardened steel bearing rod 2 with shoulder 3, to be pressed through a shaped steel sleeve 4 containing a ring of the said explosive 1. (Rod diameter is approximately 18 mm and shoulder diameter 20 mm). Approximately 80 mg of the explosive powder was put around the case-hardened steel bearing rod under the shoulder which served to compress the explosive as it was pushed through the shaped sleeve. A press-fit between rod and sleeve was specified to contain the explosive gases. Upon applying around 20 tons of downward force within a hydraulic bench press, some shear occurred within the explosive powder ring compacted under the shoulder and this initiated a fiery loud explosion which broke many pieces off the rod shoulder and even melted the nearby surface in places. This fracturing then allowed the generated explosion gas pressure of up to 60 tons per square centimeter to subside. Explosive residue of black manganese phosphide was present and the acrid odour of phosphine gas was very intense. FIG. 2 shows line drawings and photographs of two typical rods 2 with broken shoulders 3, which indicate that extreme pressure pulses must have been generated to do such damage on bearing steel. The originally shiny steel surface was scorched and eroded all around. After extracting the rod from the steel sleeve, inspection of the sleeve interior revealed a melted burnt appearance. It was found that an explosion could not be initiated by the compression until some shear occurred in the explosive mixture which generated localized hot-spots in the shear-plane. Control experiments, using inert chalk powder rather than explosive powder, never produced any sign of fiery reaction or steel failure. That is, the hardened steel rod shoulder was not fractured just because of the applied high load stress.

Figure 3:
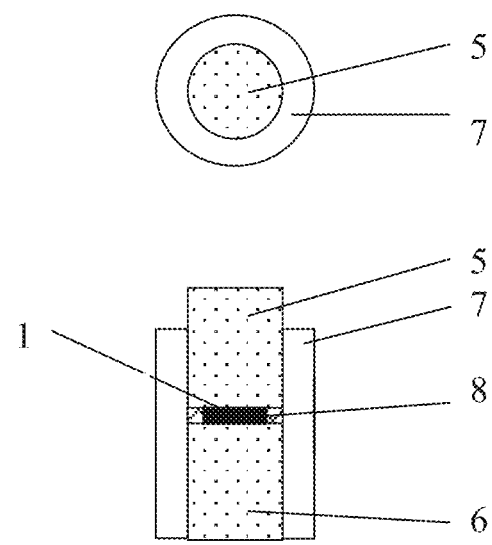
Figure 4:
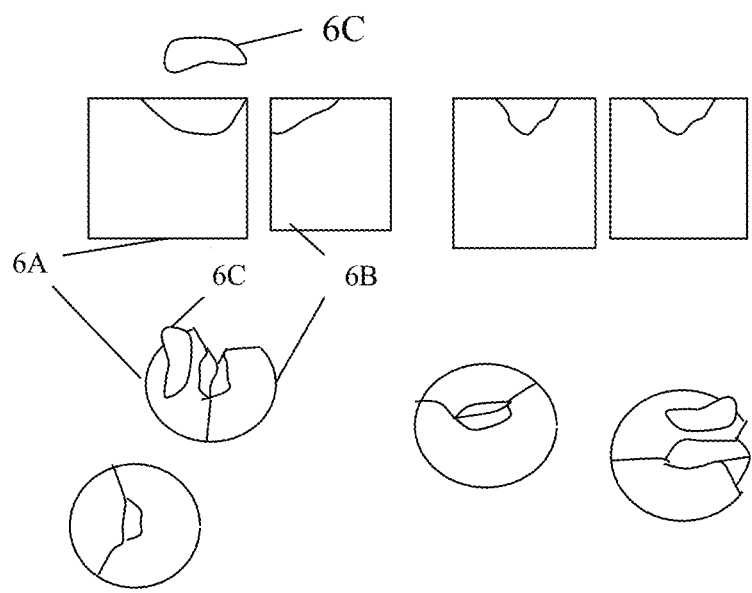
Figure 4:

FIG. 3 shows a best mode embodiment of the explosion process in which approximately 40 mg of the said explosive powder 1 was put in a compression cell consisting of two hardened steel roller bearings 5, 6, in a steel sleeve 7 with a solder ring seal 8 to contain the explosive powder 1 and generated gases. (Roller bearing diameter is approximately 10 mm and length 10 mm). In the hydraulic bench press it was subjected to a pressure of 25 tons per square centimeter in order to form a solid pellet of the explosive 1. The compression force was then removed and a thin steel (5 degree) wedge placed under the cell. As applied pressure was resumed, some shear then occurred within the pressurized explosive pellet, and loud explosive ignition occurred at a localized hot-spot within the said shear-plane. FIG. 4 illustrates line drawing representations and photographs of two separate examples, wherein the explosion gas pressure measured at around 60 tons per square centimeter was great enough over a surface area of (1 mm×4 mm) to create a cutting wedge of steel 6C within the lower bearing surface, which then cleaved that bearing into pieces 6A, 6B. The wedge shown 6C was retrieved in this case. In many cases, the bearings were shattered and the explosion ceased. Explosive residue of black manganese phosphide was produced and the acrid odour of phosphine gas was always very intense. It was found that an explosion could not be initiated without some shear (due to the lower 5 deg wedge) occurring within the explosive pellet to generate localized hot-spots in the shear-plane. This meant that the hardened steel roller bearing was not simply being crushed under applied load. In the corresponding control experiments, which used a sample of inert chalk powder instead of explosive powder, no sign of bearing steel failure ever occurred.

Figure 5:
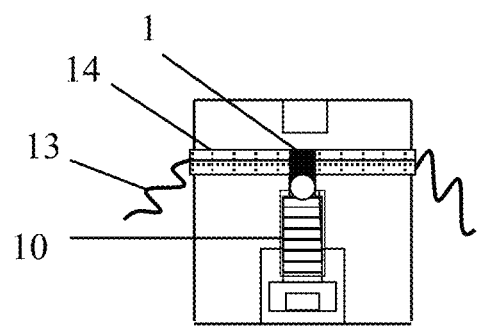

FIG. 5 shows an embodiment for producing a more controlled less violent explosion using a direct hot wire effect, wherein 40 mg of the explosive 1 was compressed by screw 10 and heated by a wire 13 carried by ceramic-metal seals 14.

The three embodiments described above are best examples taken from a number of experiments and are not intended to restrict the scope of the invention in any way. Such embodiments were developed as experimentally controllable and repeatable, designed with a view to comparing the efficacy of different chemical mixtures by producing explosions safely on a small scale. Lesser quantities of the explosive mixture than those given (below 40 mg and below 20 mg) were found not to work as well because it is necessary to get an avalanche chain reaction from the ignition hotspot in the shear plane of the explosive. On the other hand, a number of experiments were performed with larger quantities of the explosive (150 mg and 80 mg, respectively) which violently damaged the hydraulic compression jack. A few experiments with unequal proportions of the deuteride, phosphorus and manganese (e.g. 1:2:1) in the mixture showed varying degrees of success. In future commercial application, it is expected that a large quantity of explosive could be ignited with a detonator to produce an exponentially stronger explosion.

This invention relates to making a prescribed explosive mixture.

Although the present disclosure has been described with reference to preferred embodiments, workers skilled in the art will recognize that changes may be made in form and detail without departing from the spirit and scope of the disclosure.

The invention claimed is:

1. An explosive mixture compositionally comprising a powdered deuteride of an alkaline earth metal or alkali metal mixed with a catalytic mixture, wherein said catalytic mixture comprises red phosphorous powder (P) and a powdered transition metal from Period 4 or Period 5 of the Periodic table.

2. The explosive mixture of claim 1, wherein the constituent powders of deuteride and red phosphorus and transition metal are of equal weight ratio or of equal weight ratio within 10%.

3. The explosive mixture of claim 1, wherein said deuteride is of an alkaline earth metal.

4. The explosive mixture of claim 3, wherein said deuteride is of calcium (Ca).

5. The explosive mixture of claim 1, wherein said transition metal is from Period 4 of the Periodic table.

6. The explosive mixture of claim 5, wherein said transition metal is manganese (Mn).

* * * * *